US009931750B2

(12) United States Patent
Cohen et al.

(10) Patent No.: US 9,931,750 B2
(45) Date of Patent: Apr. 3, 2018

(54) AUTONOMOUS ROBOT AUTO-DOCKING AND ENERGY MANAGEMENT SYSTEMS AND METHODS

(71) Applicant: iRobot Corporation, Bedford, MA (US)

(72) Inventors: David A. Cohen, Brookline, MA (US); Daniel N. Ozick, Newton, MA (US); Clara Vu, Cambridge, MA (US); James Lynch, Georgetown, MA (US); Philip R. Mass, Portland, OR (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 15/355,518

(22) Filed: Nov. 18, 2016

(65) Prior Publication Data

US 2017/0072564 A1     Mar. 16, 2017

Related U.S. Application Data

(60) Continuation of application No. 14/946,999, filed on Nov. 20, 2015, now Pat. No. 9,550,294, which is a
(Continued)

(51) Int. Cl.
    *H02J 7/00*             (2006.01)
    *B25J 9/16*             (2006.01)
(Continued)

(52) U.S. Cl.
CPC ............ *B25J 9/1664* (2013.01); *A47L 9/009* (2013.01); *A47L 9/0063* (2013.01);
(Continued)

(58) Field of Classification Search
CPC ...... H02J 7/0036; H02J 7/0044; B25J 9/1664; A47L 9/0063; A47L 9/2805
(Continued)

(56) References Cited

U.S. PATENT DOCUMENTS

| 4,679,152 A | * | 7/1987 | Perdue | .................. B25J 19/005 |
| | | | | 180/167 |
| 5,608,306 A | | 3/1997 | Rybeck et al. | |

(Continued)

FOREIGN PATENT DOCUMENTS

EP          1331537         7/2003

OTHER PUBLICATIONS

Doty, K. L., and Harrison, R. R., Sweep Strategies for a Sensory-Driven, Behavior-Based Vacuum Cleaning Agent, AAAI 1993 Fall Symposium Series, Instantiating Real-World Agents, Research Triangle Park, Raleigh, NC, Oct. 22-24, 1993, pp. 1-6.
(Continued)

*Primary Examiner* — Edward Tso
*Assistant Examiner* — Aaron Piggush
(74) *Attorney, Agent, or Firm* — Fish & Richardson P.C.

(57) ABSTRACT

A method for energy management in a robotic device includes providing a base station for mating with the robotic device, determining a quantity of energy stored in an energy storage unit of the robotic device, and performing a predetermined task based at least in part on the quantity of energy stored. Also disclosed are systems for emitting avoidance signals to prevent inadvertent contact between the robot and the base station, and systems for emitting homing signals to allow the robotic device to accurately dock with the base station.

20 Claims, 12 Drawing Sheets

Related U.S. Application Data continuation of application No. 14/475,984, filed on Sep. 3, 2014, now Pat. No. 9,215,957, which is a continuation of application No. 13/291,633, filed on Nov. 8, 2011, now Pat. No. 8,854,001, which is a continuation of application No. 11/648,230, filed on Dec. 29, 2006, now Pat. No. 8,749,196, which is a division of application No. 10/762,219, filed on Jan. 21, 2004, now Pat. No. 7,332,890.

(51) Int. Cl.

| | |
|---|---|
| A47L 9/00 | (2006.01) |
| A47L 9/28 | (2006.01) |
| G05D 1/02 | (2006.01) |
| H02J 7/04 | (2006.01) |
| G01S 1/16 | (2006.01) |
| G01S 1/70 | (2006.01) |
| B25J 5/00 | (2006.01) |
| B25J 11/00 | (2006.01) |
| B25J 19/00 | (2006.01) |
| B60L 11/18 | (2006.01) |

(52) U.S. Cl.
CPC ........... *A47L 9/2805* (2013.01); *A47L 9/2852* (2013.01); *A47L 9/2857* (2013.01); *A47L 9/2873* (2013.01); *A47L 9/2889* (2013.01); *A47L 9/2894* (2013.01); *B25J 5/00* (2013.01); *B25J 11/0085* (2013.01); *B25J 19/005* (2013.01); *B60L 11/1816* (2013.01); *G01S 1/16* (2013.01); *G01S 1/70* (2013.01); *G05D 1/0219* (2013.01); *G05D 1/0225* (2013.01); *G05D 1/0227* (2013.01); *G05D 1/0242* (2013.01); *H02J 7/0026* (2013.01); *H02J 7/0036* (2013.01); *H02J 7/0044* (2013.01); *H02J 7/0045* (2013.01); *H02J 7/045* (2013.01); *A47L 2201/02* (2013.01); *A47L 2201/022* (2013.01); *A47L 2201/04* (2013.01); *G05D 2201/0203* (2013.01); *G05D 2201/0208* (2013.01); *G05D 2201/0215* (2013.01); *H02J 7/0052* (2013.01); *Y10S 901/01* (2013.01)

(58) Field of Classification Search
USPC ......... 320/104, 107, 109, 134; 700/258, 262
See application file for complete search history.

(56) References Cited

U.S. PATENT DOCUMENTS

| | | | |
|---|---|---|---|
| 5,646,494 A * | 7/1997 | Han | A47L 11/4011 318/587 |
| 5,710,506 A | 1/1998 | Broell et al. | |
| 5,926,909 A | 7/1999 | McGee | |
| 5,995,884 A | 11/1999 | Allen | |
| 6,389,329 B1 * | 5/2002 | Colens | A47L 5/30 180/167 |
| 6,532,404 B2 | 3/2003 | Colens | |
| 6,594,844 B2 | 7/2003 | Jones | |
| 6,690,134 B1 | 2/2004 | Jones et al. | |
| 6,764,373 B1 * | 7/2004 | Osawa | B25J 19/005 180/169 |
| 6,781,338 B2 | 8/2004 | Jones et al. | |
| 6,809,490 B2 | 10/2004 | Jones et al. | |
| 6,859,010 B2 | 2/2005 | Jeon et al. | |
| 6,883,201 B2 | 4/2005 | Jones et al. | |
| D510,066 S | 9/2005 | Hickey et al. | |
| 6,956,348 B2 | 10/2005 | Landry et al. | |
| 6,957,712 B2 | 10/2005 | Song et al. | |
| 6,965,209 B2 | 11/2005 | Jones et al. | |
| 7,024,278 B2 | 4/2006 | Chiappetta et al. | |
| 7,155,308 B2 | 12/2006 | Jones | |
| 7,173,391 B2 | 2/2007 | Jones et al. | |
| 7,332,890 B2 | 2/2008 | Cohen et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |
| 7,636,982 B2 | 12/2009 | Jones et al. | |
| 7,706,917 B1 | 4/2010 | Chiappetta et al. | |
| 7,761,954 B2 | 7/2010 | Ziegler | |
| 8,087,117 B2 | 1/2012 | Kapoor et al. | |
| 8,386,081 B2 | 2/2013 | Landry et al. | |
| 9,008,835 B2 | 4/2015 | Dubrovsky et al. | |
| 8,972,052 B2 | 5/2015 | Chiappetta | |
| 9,215,957 B2 | 12/2015 | Cohen | |
| 9,550,294 B2 | 1/2017 | Cohen et al. | |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2005/0067994 A1 | 3/2005 | Jones et al. | |
| 2005/0204717 A1 | 9/2005 | Colens | |
| 2007/0266508 A1 | 11/2007 | Jones et al. | |
| 2008/0140255 A1 | 6/2008 | Ziegler et al. | |
| 2008/0155768 A1 | 7/2008 | Ziegler et al. | |
| 2008/0307590 A1 | 12/2008 | Jones et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2017/0072564 A1 | 3/2017 | Cohen et al. | |

OTHER PUBLICATIONS

Everett, H.R., "Sensors for Mobile Robots," AK Peters, Ltd., Wellesley, MA, 1995, 543 pages.

Honda Motor Co., Ltd., English Translation of JP11212642, Aug. 9, 1999, 31 pages.

Jones, J., Roth, D. "Robot Programming: A Practical Guide to Behavior-Based Robotics," McGraw-Hill Education TAB, Jan. 2, 2004, 288 pages.

Prassler, et al., English Translation of DE19849978, Feb. 8, 2001, 16 pages.

'Trilobite.electrolux.se' [online]. "Facts on the Trilobite," Retrieved from the Internet at URL http://trilobiteelectroluxse/ presskit_en/model11335asp?print=yes&pressID=, Dec. 12, 2003, 2 pages.

'www.electroluxusa.com' [online]. "Electrolux-Designed for the well-lived home; Welcome to the Electrolux Trilobite," Retrieved from the Internet at URL<http://www.electroluxusa.com/node57.as[?currentURL=nodel42.asp%3F, Mar. 18, 2005, 2 pages.

'www.i4u.com' [online]. Hitachi, News release: "The home cleaning robot of the autonomous movement type (experimental machine)," Retrieved from the Internet at URL<www.i4u.com./japanreleases/hitachirobot.htm, Mar. 18, 2005, 5 pages.

Karcher, "Product Manual Download 'Karch'," available at www.karcher.com, 2004, 16 pages.

'www.robocleaner.de' [online]. "Karcher RoboCleaner RC 3000," Retrieved from the Internet at URL<www.robocleaner.de/english/screen3.html, Dec. 2003, 4 pages.

'www.karcher-usa.com' [online]. "Karcher USA, RC3000 Robotic Cleaner," Retrieved from the Internet at URL http:// www.karcher-usa.com/showproducts.php?op=viewprod&param1=143&param2=¶m3, Mar. 2005, 3 pages.

Maschinemarkt Wurzburg 105, No. 27, pp. 3, 30, Jul. 5, 1999 (with English translation).

\* cited by examiner

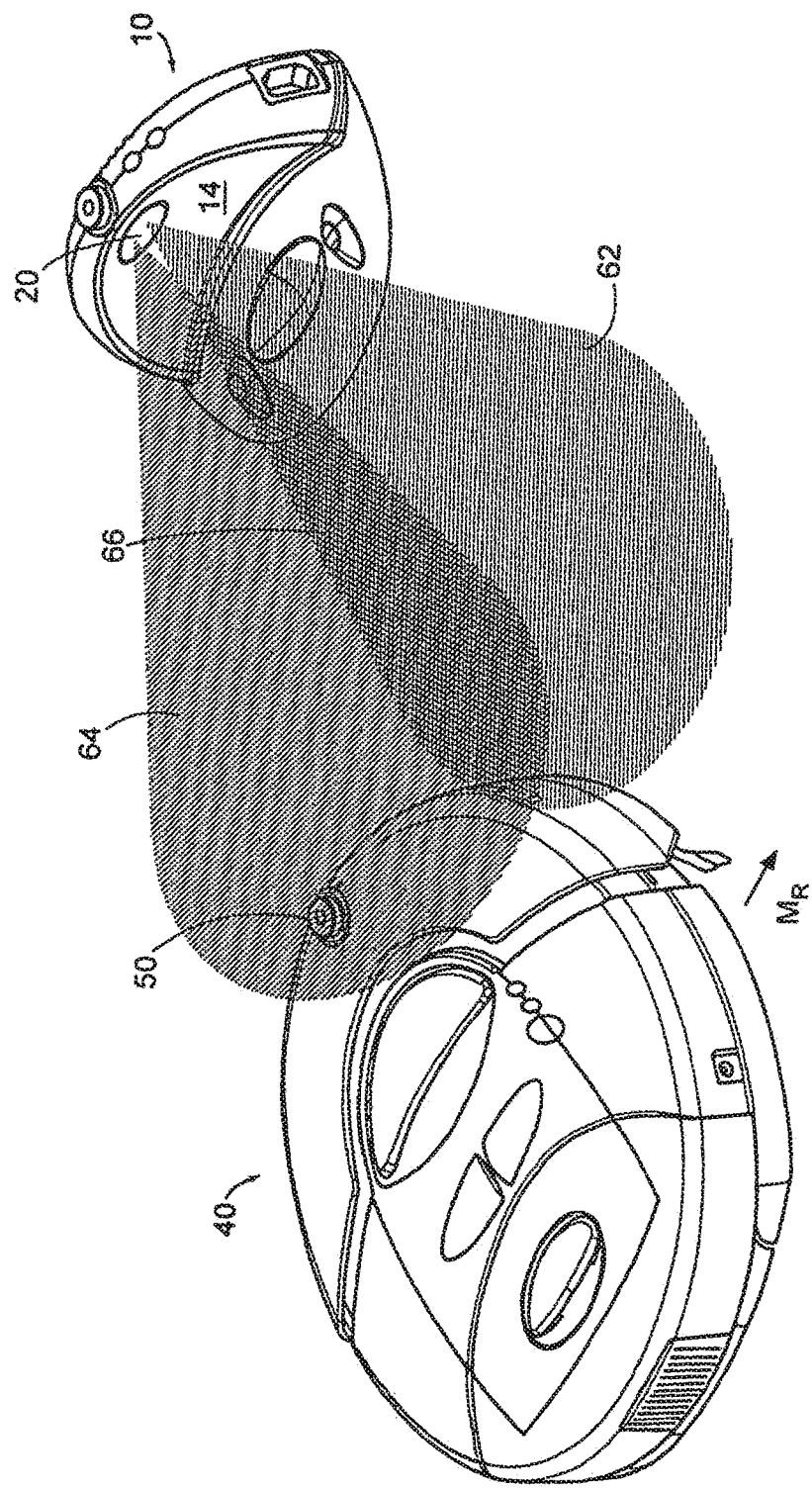

AUTONOMOUS ROBOT AUTO-DOCKING AND ENERGY MANAGEMENT SYSTEMS AND METHODS

This application is a continuation of, and claims priority under 35 U.S.C. § 120 from, U.S. application Ser. No. 14/946,999, entitled "Autonomous Robot Auto=Docking and Energy Management Systems and Methods," filed on Nov. 20, 2015, which is a continuation of, and claims priority under 35 U.S.C. § 120 from, U.S. application Ser. No. 14/475,984, entitled "Autonomous Robot Auto-Docking and Energy Management Systems and Methods," filed on Sep. 3, 2014, which is a continuation of, and claims priority under 35 U.S.C. § 120 from, U.S. application Ser. No. 13/291,633, entitled "Autonomous Robot Auto-Docking and Energy Management Systems and Methods," filed on Nov. 8, 2011, which is a continuation of, and claims priority under 35 U.S.C. § 120 from, U.S. application Ser. No. 11/648,230, entitled "Autonomous Robot Auto-Docking and Energy Management Systems and Methods," filed on Dec. 29, 2006, which is a divisional, and claims priority under 35 U.S.C. § 120 from, U.S. application Ser. No. 10/762,219, entitled "Autonomous Robot Auto-Docking and Energy Management Systems and Methods," filed on Jan. 21, 2004. The disclosures of each of these prior applications are considered part of the disclosure of this application and are hereby incorporated by reference in their entireties.

TECHNICAL FIELD

The present invention relates generally to robotic systems and, more specifically, to auto-docking and energy management systems for autonomous robots.

BACKGROUND

Automated robots and robotic devices are becoming more prevalent today and are used to perform tasks traditionally considered mundane, time-consuming, or dangerous. As the programming technology increases, so too does the demand for robotic devices that require a minimum of human interaction for tasks such as robot refueling, testing, and servicing. A goal is a robot that could be configured a single time, which would then operate autonomously, without any need for human assistance or intervention.

Robotic devices and associated controls, navigational systems, and other related systems moving in this direction are being developed. For example, U.S. Pat. No. 6,594,844 discloses a Robot Obstacle Detection System, the disclosure of which is hereby incorporated by reference in its entirety. Additional robot control and navigation systems are disclosed in U.S. patent application Ser. Nos. 10/167,851, 10/056,804, 10/696,456, 10/661,835, and 10/320,729 the disclosures of which are hereby incorporated by reference in their entireties.

Generally, autonomous robotic devices include an onboard power unit (usually a battery) that is recharged at a base or docking station. The types of charging stations and methods used by robots in finding or docking with them (e.g., radio signals, dead reckoning, ultrasonic beams, infrared beams coupled with radio signals, etc.) vary greatly in both effectiveness and application. Wires buried below the surface on which the robot operates are common, but are obviously limited in application, as it is costly to install guide wires within the floor of a building or below a road surface. If installed on the surface, the guide wires may be damaged by the robot itself or other traffic. Moreover, the wires need to be moved when the base station is relocated. A base station that emits a beam or beacon to attract the robotic device is, therefore, more desirable. Such devices, however, still exhibit numerous operational limitations.

Base stations that utilize emitted signals often still require additional safeguards to ensure proper mating between the robot and base station and, therefore, safe and effective charging. Some require mechanical locking devices to prevent dislocation of the robot during charging, or other components such as raised guiding surfaces to direct the robot into contact with the station. Such components can increase the size of the base station while decreasing the aesthetics, important considerations for automated robots directed at the consumer market. An increase in base station size also typically makes unobtrusive placement in the home more difficult and decreases the floor area available for cleaning. Additionally, existing base stations generally lack the ability to protect themselves from contact with the robot during operation, increasing the likelihood of damage to either the station or robot, or dislocation of the base station. Such an unintentional collision may require human intervention to reposition the base station or repair a damaged component.

These limitations are, at present, a hurdle to creating a truly independent autonomous robot, free from human interaction. There is, therefore, a need for a robot and base station that can ensure proper mating regardless of location of the base station. Moreover, a system that can prevent inadvertent dislocation of the base station by eliminating collisions between the station and robot is desirable.

SUMMARY OF THE INVENTION

In one aspect, the invention relates to a method for energy management in a robotic device, the robotic device including at least one energy storage unit and a signal detector. The method includes the steps of: providing a base station for mating with the robotic device, the base station having a plurality of signal emitters including a first signal emitter and a second signal emitter, determining a quantity of energy stored in the energy storage unit, the quantity characterized at least by a high energy level and a low energy level; and performing, by the robotic device, a predetermined task based at least in part on the quantity of energy stored. In various embodiments of the foregoing aspect, coulometry or setting a time period are used to determine the quantity of energy stored or task period of the device.

In other embodiments of the foregoing aspect, the step of performing the predetermined task occurs when the quantity of energy stored exceeds the high energy level, the predetermined task including movement of the robotic device away from the base station in response to reception, by the signal detector, of a base station avoidance signal. Still other embodiments include the step of returning the robotic device to the base station in response to reception, by the signal detector, of a base station homing signal and/or returning the robotic device to the base station when the quantity of energy stored is less than the high energy level. In other embodiments of the foregoing aspect, the step of returning the robotic device to the base station occurs when the quantity of energy stored is less than the low energy level, and wherein the predetermined task includes a reduction in energy use by the robotic device. Various embodiments further include altering a travel characteristic of the robotic device to locate effectively the base station, charging the device upon contact, and/or resuming the predetermined or a different task.

In another aspect, the invention relates to a method of docking a robotic device with a base station that has a plurality of signal emitters, including a first signal emitter and a second signal emitter. The method includes the steps of orienting the robotic device in relation to (i) a first signal transmitted by the first signal emitter and (ii) a second signal transmitted by the second signal emitter, and maintaining an orientation of the robotic device relative to the first and second signals as the robotic device approaches to the base station. Certain embodiments of the method of the foregoing aspect include the steps of detecting, by the robotic device, an overlap between the first signal and the second signal; following, by the robotic device, a path defined at least in part by the signal overlap; and docking the robotic device with the base station. Other related embodiments include reducing the velocity of the robotic device in the step of following the path defined at least in part by the signal overlap.

Various embodiments of the method of the foregoing aspect also include, during the step of docking the robotic device with the base station: detecting, by the robotic device, contact with charging terminals on the base station, and stopping movement of the robotic device. In some embodiments, contact of one or more on-board tactile sensors can be used, additionally or alternatively, to stop movement of the robotic device. Other embodiments include the step of charging fully the robotic device and/or charging the robotic device to one of a plurality of charging levels. Certain embodiments allow for resumption of the predetermined task or a new task upon completion of charging.

In another aspect of the invention, the invention relates to an autonomous system including a base station, that includes charging terminals for contacting external terminals of a robotic device, and a first signal emitter and a second signal emitter. Certain embodiments of the above aspect provide that the first signal emitter transmit a base station avoidance signal and the second signal emitter transmit a base station homing signal. In other embodiments, the homing signal is a pair of signals, which can be either the same or different. The pair of signals may be emitted by a pair of emitters. In some embodiments, the signals may overlap, and may be optical signals.

Certain embodiments of the above aspect further include a robotic device for performing a predetermined task, the robotic device having at least one energy storage unit with an external terminal for contacting the charging terminal, and at least one signal detector. In certain embodiments, the at least one signal detector is adapted to detect at least one optical signal. The robotic device has, in certain embodiments, the capability to distinguish between the signals generated by multiple emitters.

Still other aspects of the current invention relate to an energy manager including: a robotic device having at least one energy storage unit and a signal detector; a base station for mating with the robotic device, the base station having a plurality of signal emitters including a first signal emitter and a second signal emitter; and a processor for determining a quantity of energy stored in the energy storage unit. Certain embodiments of the foregoing aspect use coulometry or set a time period to determine the quantity of energy stored or task period of the device. In still other embodiments the first signal emitter transmits an avoidance signal, thereby restricting a movement of the robotic device to directions away from the base station, and the second signal emitter transmits a homing signal, thereby directing a movement of the robotic device to the base station.

Other aspects of the invention relate to a homing system including a robotic device having a signal detector, and a base station having a first signal emitter and a second signal emitter. Certain embodiments of the foregoing aspect overlap signals transmitted by the first signal emitter and the second signal emitter. Still other embodiments further include charging terminals on the base station, and charging terminals on the robotic device.

An additional aspect of the invention relates to a homing system for a base station including a first signal emitter that transmits a first signal projected outward from the first signal emitter, and a second signal emitter that transmits a second signal projected outward from the second signal emitter, such that the first signal and the second signal overlap. Another aspect relates to an avoidance system for restricting a movement of at least one of a first device and a second device, the avoidance system including a first device that emits a signal, and a second device that receives the signal, thereby restricting the movement of at least one of the first device and the second device.

Still another aspect of the invention relates to a base station, including a base plate and a backstop, for a robotic device including: electrical contacts located on a top side of the base plate; a first signal emitter located on the backstop wherein a signal transmitted by the first signal emitter restricts the robotic device from moving within a predetermined distance of the base station; and a second signal emitter and a third signal emitter, wherein a plurality of signals transmitted by the second signal emitter and the third signal emitter guide at least one electrical contact of the robotic device to contact the at least one electrical contact of the base station.

Another aspect of the invention relates to a method of charging a battery of a device, the method having the steps of providing low power to charging terminals of a charger, detecting presence of the device by monitoring at least one of a predetermined change in and a predetermined magnitude of a parameter associated with the charger, and increasing power to the charging terminals to charge the battery. One embodiment of the method of the above aspect further includes the steps of determining a level of charge in the device, and permitting charging of the battery in the device when the level of charge is below a predetermined threshold.

Still another aspect of the invention relates to a system for charging a mobile device, the system having: a stationary charger comprising first charging terminals, circuitry for detecting presence of the device by monitoring at least one of a predetermined change in and a predetermined magnitude of a parameter associated with the charger, and a mobile device having: a battery, and second charging terminals adapted to mate with first charging terminals. Various embodiments of the above aspect include systems wherein the circuitry determines a level of charge in the battery and controls a power level provided to the first charging terminals. Still other embodiments include systems wherein the circuitry increases the power level provided to the first charging terminals upon measuring a predetermined voltage across the first charging terminals when mated with the second charging terminal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the present invention are described with reference to the following drawings, in which:

FIGS. 4A-4C are schematic perspective views of representations of homing signals in accordance with one embodiment of the invention transmitted by the base station and detected by the robotic device;

DETAILED DESCRIPTION

Figure 1:
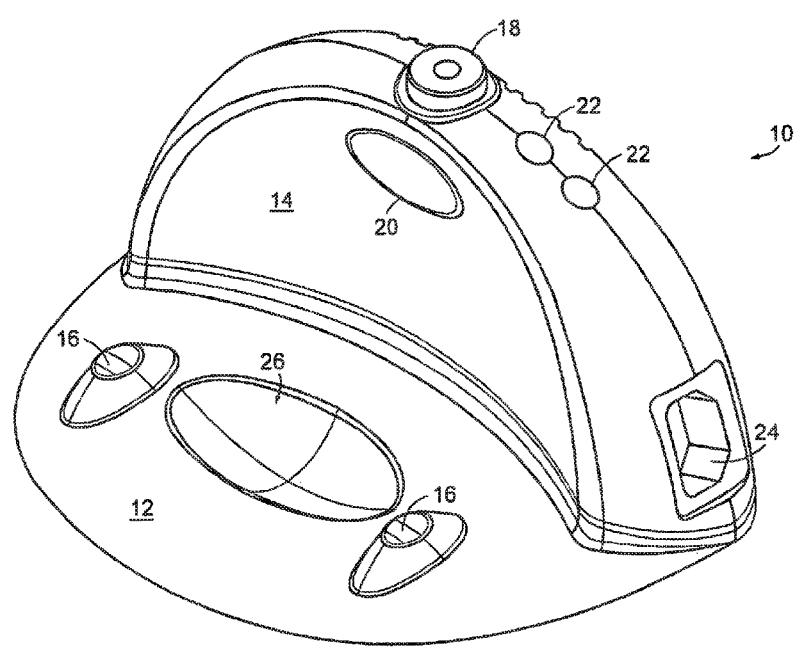
FIG. 1 is a schematic perspective view a base station in accordance with one embodiment of the invention.

FIG. 1 is a schematic perspective view a base station 10 in accordance with one embodiment of the invention. The base station 10 includes both a substantially horizontal base plate 12 and a substantially vertical backstop 14. The base station 10 may be any of a variety of shapes or sizes, providing sufficient space for the desired components and systems, described below. The base plate 12 is generally parallel to the ground surface on which the base station 10 rests, but may have a slight upwards angle directed toward the backstop 14. By minimizing the angle of rise of the base plate 12, the robotic device (FIGS. 2A-2B) may easily dock with the station 10. Electrical charging contacts 16 are located on a top surface of the base plate 12, allowing them to contact corresponding contacts (FIG. 2B) on the underside of the robotic device. The contacts 16 or the contacts on the robot may be either fixed or compliant. In the depicted embodiment, two contacts 16 (one positive, one negative) are utilized to properly detect a completed circuit when the robot 40 docks with the base station 10. This circuit recognition sequence is described in more detail below. In other embodiments, however, a single contact 16 or more than two contacts may be utilized. An additional contact would provide redundancy in the event that one of the robot contacts becomes damaged, dirty, or obstructed. This would allow the robot to dock and recharge itself properly, even after such an occurrence. Other embodiments utilize two contacts 16 to charge the battery and additional contacts to transmit data and information between the devices.

The contacts 16 are sized and positioned to reliably and repeatably contact the corresponding contacts on the robot. For example, the contacts 16 may be oversized and/or may extend above the base plate 12, e.g., in a domed shape, to ensure contact with the robot contacts. Alternatively, the contacts 16 may be flush-mounted on a base plate 12 with a higher angle of rise or may protrude above a base plate 12 that is flat or has substantially no rise. Depending on the application, the base plate 12 angle of rise may vary from 0° to up to 20° and greater. The embodiment depicted in FIG. 1 also includes a depression 26 in the base plate 12, between the two contacts 16, sized to engage a front caster (FIG. 2B) of the robot. The depression 26, in combination with the configuration of the charging contacts 16, ensures proper alignment and registration between the charging contacts on both the base station 10 and the robot. Alternatively, the depression 26 may contain one or more of the contacts 16 arranged to mate with one or more corresponding contacts on the front caster of the robot.

The backstop 14 provides locations for many of the base station 10 components. Specifically, in the depicted embodiment, the backstop 14 includes a top signal emitter 18, a front signal emitter 20, several indicator LEDs 22, and an AC plug receptacle 24. The top signal emitter 18 generates a first signal, such as an avoidance signal (FIG. 3), in a diffuse region near the base station 10 to prevent generally the robot from coming into inadvertent direct contact with the base station 10 while performing a task, such as vacuuming. The top signal emitter 18 generally utilizes a parabolic reflector to transmit the avoidance signal. In such an embodiment, the avoidance signal is emitted by a single LED directed at a lens whose geometry is determined by rotating a parabola about its focus. This parabolic reflector thus projects the avoidance signal 60 out in a 360° pattern, without the necessity of multiple emitters. A similar configuration can be employed in the detector on the robot, with a single receiver used in place of the single LED.

While the location of the top signal emitter 18 may vary, locating the emitter 18 on top of the backstop 14 transmits the avoidance signal through an uninterrupted 360° field around the base station 10. Alternatively, base stations designed for corner, on-wall, or near-wall installation may project the avoidance signal substantially only along the unobstructed side. The front signal emitter 20 projects one or more additional signals, such as homing beams (FIGS. 4A-4C), to allow the robotic device to orient itself during docking with the base station 10 for recharging or during periods of non-use. Naturally, if properly located on the base station 10, a single emitter may be used to perform the functions of both emitters 18, 20. Both the avoidance signal and homing beams are described in more detail below.

Figure 2A:
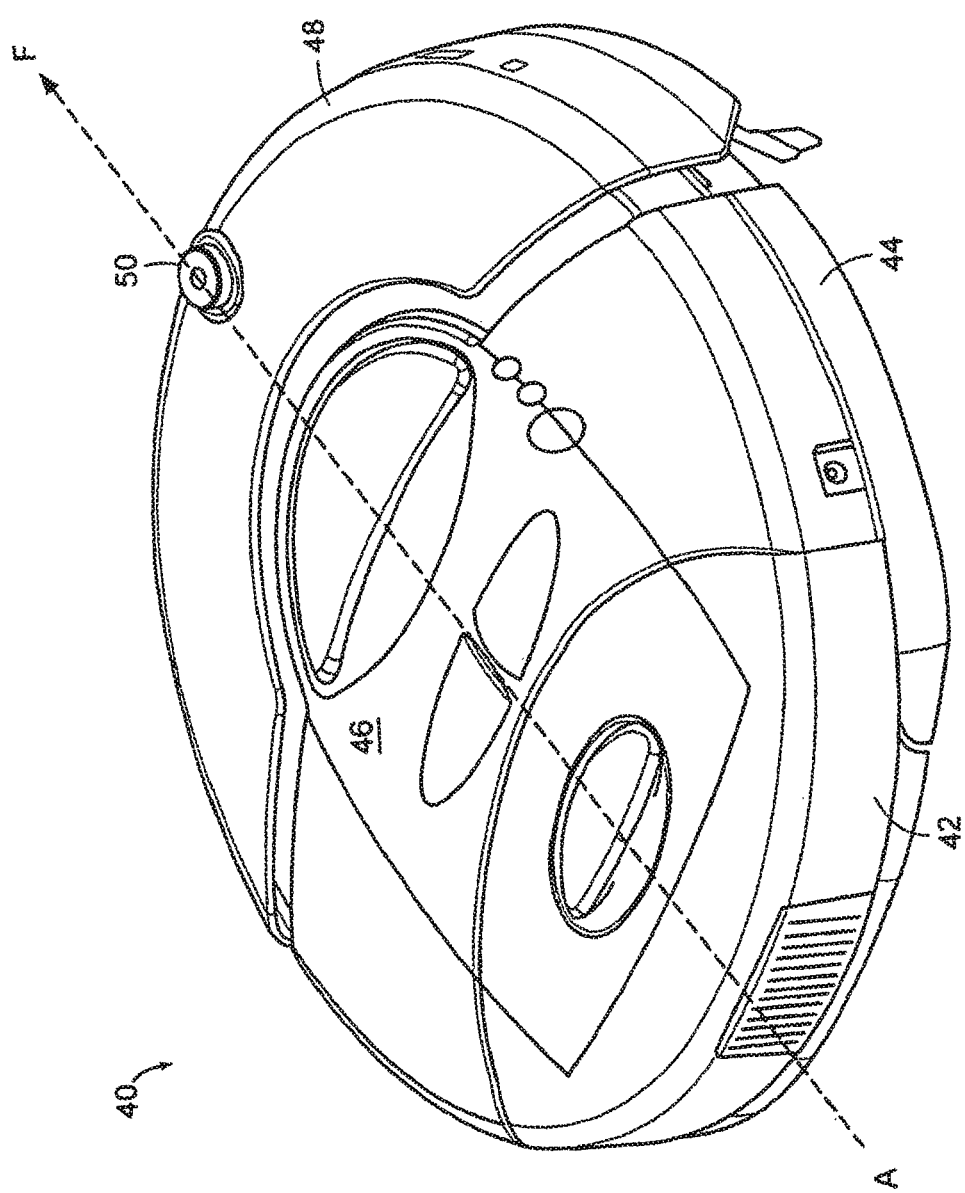
FIG. 2A is a schematic perspective view of an robotic device in accordance with one embodiment of the invention.
Figure 2B:
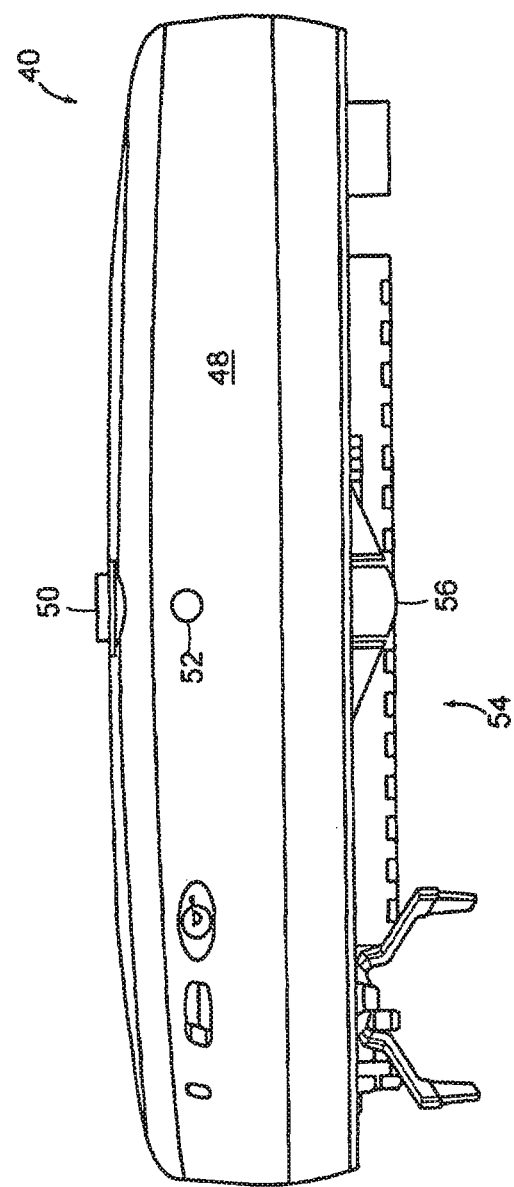
FIG. 2B is a schematic side view of the robotic device of FIG. 2A.

FIGS. 2A-2B are schematic perspective views of a robotic device, such as an autonomous robot 40 adapted to mate with the base station 10. In the following description of the autonomous robot 40, use of the terminology "forward/fore" refers generally to the primary direction of motion of the robot 40, and the terminology fore-aft axis (see reference characters "FA" in FIG. 2A) defines the forward direction of motion (indicated by arrowhead of the fore-aft axis FA), which is coincident with the fore-aft diameter of the robot 40.

In the embodiment depicted, the housing infrastructure 42 of the robot 40 includes a chassis 44, a cover 46, and a displaceable bumper 48. The chassis 44 may be molded from a material such as plastic as a unitary element that includes a plurality of preformed wells, recesses, and structural members for, inter alia, mounting or integrating elements of the various subsystems that operate the robotic device 40. Such subsystems may include a microprocessor, a power subsystem (including one or more power sources for the various subsystems and components), a motive subsystem, a sensor subsystem, and task-specific component subsystems. The cover 46 may be molded from a material such as plastic as a unitary element that is complementary in configuration with the chassis 44 and provides protection of and access to elements and components mounted to the chassis 44. The chassis 44 and the cover 46 are detachably integrated in combination by any suitable means (e.g., screws), and in combination, the chassis 44 and cover 46 form a structural envelope of minimal height having a generally cylindrical configuration that is generally symmetrical along the fore-aft axis FA.

The displaceable bumper 48, which has a generally arcuate configuration, is mounted in movable combination at the forward portion of the chassis 44 to extend outwardly therefrom (the "normal operating position"). The mounting configuration of the displaceable bumper 48 is such that it is displaced towards the chassis 44 (from the normal operating position) whenever the bumper 48 encounters a stationary object or obstacle of predetermined mass (the "displaced position"), and returns to the normal operating position when contact with the stationary object or obstacle is terminated (due to operation of a control sequence which, in response to any such displacement of the bumper 48, implements a "bounce" mode that causes the robot 40 to evade the stationary object or obstacle and continue its task routine).

Mounted on the robotic device 40 are a pair of detectors 50, 52. In this embodiment of the robotic device 40, the detectors 50, 52 receive signals projected from the emitters 18, 20 on the base station 10. In other embodiments, a single detector receives signals from both emitters 18, 20 on the base station 10, or more than two detectors may be used. In certain embodiments, the detectors 50, 52 are standard infrared ("IR") detector modules, that include a photodiode and related amplification and detection circuitry, in conjunction with an omni-directional lens, where omni-directional refers to a substantially single plane. The IR detector module can be of the type manufactured by East Dynamic Corporation (p/n IRM-8601S). However, any detector, regardless of modulation or peak detection wavelength, can be used as long as the emitters 18, 20 on the base station 10 are adapted to match the detectors 50, 52 on the robot 40. In another embodiment, IR phototransistors may be used with or without electronic amplification elements and may be connected directly to the analog inputs of a microprocessor. Signal processing may then be used to measure the intensity of IR light at the robot 40, which provides an estimate of the distance between the robot 40 and the source of IR light. Alternatively, radio frequencies, magnetic fields, and ultrasonic sensors and transducers may be employed. As shown in FIGS. 2A-2B, at least one detector 50 is mounted at the highest point on the robot 40 and toward the front of the robot 40 as defined by the primary traveling direction, as indicated by an arrow on axis FA.

While the detector 50 is mounted at the highest point of the robot 40 in order to avoid shadows, it is desirable in certain applications to minimize the height of the robot 40 and/or the detector 50 to prevent operational difficulties and to allow the robot 40 to pass under obstacles. In certain embodiments, the detector 50 can be spring-mounted to allow the detector 50 to collapse into the body of the robot 40 when the robot 40 runs under a solid overhanging object.

One of skill in the art will recognize that, in alternative embodiments, multiple detectors can be used. Such an embodiment might include using multiple side-mounted sensors or detectors. Each of the sensors can be oriented in a manner so that a collective field of view of all the sensors corresponds to that of the single, top mounted sensor. Because a single, omni-directional detector is mounted at the highest point of the robot for optimal performance, it is possible to lower the profile of the robot by incorporating multiple, side mounted detectors.

The undercarriage of the robotic device 40 is indicated generally by numeral 54. One or more charging contacts are present in the undercarriage 54, configured in such a location to correspond with the location of the electrical contacts 16 of the base station 10. Generally, the charging contacts on the robotic device mirror those present on the base station 10, regardless of their location or orientation. In certain embodiments, the charging contacts may be larger on either the base station 10 or robot 40, to allow wider compliance in making contact. Also, the motive and task specific components of the robot 40 are located in the undercarriage 54. The motive components may include any combination of motors, wheels, drive shafts, or tracks as desired, based on cost or intended application of the robot 40, all of which are well known in the art. The motive components may include at least one caster 56 which, in this embodiment, drives the robot 40 and mates with the depression 26 on the base plate 12. As the tasks to which the robotic device 40 is suited are virtually unlimited, so too are the components to perform those tasks. For example, the robotic device 40 may be used for floor waxing and polishing, floor scrubbing, ice resurfacing (as typically performed by equipment manufactured under the brand name Zamboni®), sweeping and vacuuming, unfinished floor sanding and stain/paint application, ice melting and snow removal, grass cutting, etc. Any number of components may be required for such tasks, and may each be incorporated into the robotic device 40, as necessary. For simplicity, this application will describe vacuuming as the demonstrative predetermined task. It will be apparent, though, that the energy management and auto-docking functions disclosed herein have wide application across a variety of robotic systems.

The robotic device 40 uses a variety of behavioral modes to vacuum effectively a working area. Behavioral modes are layers of control systems that can be operated in parallel. The microprocessor is operative to execute a prioritized arbitration scheme to identify and implement one or more dominant behavioral modes for any given scenario, based upon inputs from the sensor system. The microprocessor is also operative to coordinate avoidance, homing, and docking maneuvers with the base station 10.

Generally, the behavioral modes for the described robotic device 40 can be characterized as: (1) coverage behavioral modes; (2) escape behavioral modes; and (3) safety behavioral modes. Coverage behavioral modes are primarily designed to allow the robotic device 40 to perform its operations in an efficient and effective manner, while the escape and safety behavioral modes are priority behavioral modes implemented when a signal from the sensor system indicates that normal operation of the robotic device 40 is impaired (e.g., obstacle encountered), or is likely to be impaired (e.g., drop-off detected).

Representative and illustrative coverage behavioral modes (for vacuuming) for the robotic device 40 include: (1) a Spot Coverage pattern; (2) an Obstacle-Following (or Edge-Cleaning) Coverage pattern, and (3) a Room Coverage pattern. The Spot Coverage pattern causes the robotic device 40 to clean a limited area within the defined working area, e.g., a high-traffic area. In a certain embodiments the Spot Coverage pattern is implemented by means of a spiral algorithm (but other types of self-bounded area algorithms, such as polygonal, can be used). The spiral algorithm, which causes outward or inward spiraling movement of the robotic device 40, is implemented by control signals from the microprocessor to the motive system to change the turn radius/radii thereof as a function of time or distance traveled (thereby increasing/decreasing the spiral movement pattern of the robotic device 40).

The robotic device 40 is operated in the Spot Coverage pattern for a predetermined or random period of time, for a predetermined or random distance (e.g., a maximum spiral distance) and/or until the occurrence of a specified event, e.g., activation of one or more of the obstacle detection systems (collectively a transition condition). Once a transition condition occurs, the robotic device 40 can implement or transition to a different behavioral mode, e.g., a Straight Line behavioral mode (in one embodiment of the robotic device 40, the Straight Line behavioral mode is a low priority, default behavior that propels the robot in an approximately straight line at a preset velocity of approximately 0.306 m/s) or a Bounce behavioral mode in combination with a Straight Line behavioral mode. The Bounce behavioral mode is a basic function that allows the robot 40 to evade a stationary object or obstacle and continue its task routine. Avoidance is achieved by executing a series of turns until the obstacle is no longer detected (i.e., the bumper 48 is no longer compressed).

If the transition condition is the result of the robotic device 40 encountering an obstacle, the robotic device 40 can take other actions in lieu of transitioning to a different behavioral mode. The robotic device 40 can momentarily implement a behavioral mode to avoid or escape the obstacle and resume operation under control of the spiral algorithm (i.e., continue spiraling in the same direction). Alternatively, the robotic device 40 can momentarily implement a behavioral mode to avoid or escape the obstacle and resume operation under control of the spiral algorithm (but in the opposite direction—effective spiraling).

The Obstacle-Following Coverage pattern causes the robotic device 40 to clean the perimeter of the defined working area, e.g., a room bounded by walls and/or the perimeter of an obstacle (e.g., furniture) within the defined working area. Preferably, the robotic device 40 utilizes an obstacle-following system to continuously maintain its position with respect to an obstacle, such as a wall or a piece of furniture, so that the motion of the robotic device 40 causes it to travel adjacent to and concomitantly clean along the perimeter of the obstacle. Different embodiments of the obstacle-following system can be used to implement the Obstacle-Following behavioral pattern.

In certain embodiments, the obstacle-following system is operated to detect the presence or absence of the obstacle. In an alternative embodiment, the obstacle-following system is operated to detect an obstacle and then maintain a predetermined distance between the obstacle and the robotic device 40. In the first embodiment, the microprocessor is operative, in response to signals from the obstacle-following system, to implement small clockwise or counterclockwise turns to maintain its position with respect to the obstacle. The robotic device 40 implements a small clockwise turn when the robotic device 40 transitions from obstacle detection to non-detection (reflection to non-reflection) or to implement a small counterclockwise turn when the robotic device 40 transitions from non-detection to detection (non-reflection to reflection). Similar turning behaviors are implemented by the robotic device 40 to maintain the predetermined distance from the obstacle.

The robotic device 40 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection system a predetermined number of times (collectively a transition condition). In certain embodiments, the microprocessor will cause the robotic device 40 to implement an Align behavioral mode upon activation of the obstacle-detection system in the Obstacle-Following behavioral mode, wherein the robot 40 implements a minimum angle counterclockwise turn to align the robotic device 40 with the obstacle.

The Room Coverage pattern can be used by the robotic device 40 to clean any defined working area that is bounded by walls, stairs, obstacles or other barriers (e.g., a virtual wall unit that prevents the robotic device 40 from passing through an otherwise unbounded zone). Certain embodiments of the Room Coverage pattern include the Random-Bounce behavioral mode in combination with the Straight Line behavioral mode. Initially, the robotic device 40 travels under control of the Straight-Line behavioral mode (wheels operating at the same rotational speed in the same direction) until an obstacle is encountered. The obstacle may be indicated by physical contact with a wall or detection of the base station avoidance signal. Upon activation of one or more of the obstacle detection system, the microprocessor is operative to compute an acceptable range of new directions based upon the obstacle detection system activated. The microprocessor selects a new heading from within the acceptable range and implements a clockwise or counterclockwise turn to achieve the new heading with minimal movement. In some embodiments, the new turn heading may be followed by forward movement to increase the cleaning efficiency of the robotic device 40. The new heading may be randomly selected across the acceptable range of headings, or based upon some statistical selection scheme, such as Gaussian distribution. In other embodiments of the Room Coverage behavioral mode, the microprocessing unit can be programmed to change headings randomly or at predetermined times, without input from the sensor system.

The robotic device 40 is operated in the Room Coverage behavioral mode for a predetermined or random period of time, for a predetermined or random distance (e.g., a maximum or minimum distance) and/or until the occurrence of a specified event, e.g., activation of the obstacle-detection system a predetermined number of times (collectively a transition condition).

Certain embodiments of the robotic device 40 include four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 40. One or more of these behavioral modes may be implemented, for example, in response to a current rise in one of the task components (indicating some sort of interference), the forward bumper 48 being in compressed position for determined time period, or detection of a wheel-drop event.

In the Turn behavioral mode, the robotic device 40 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45° to 90°, large panic turns are preferably in the range of 90° to 270°. The Turn behavioral mode prevents the robotic device 40 from becoming stuck on surface impediments (e.g., high spot on carpet), from becoming stuck under other obstacles (e.g., an overhang), or from becoming trapped in a confined area.

In the Edge behavioral mode, the robotic device 40 follows the edge of an obstacle unit it has turned through a predetermined number of degrees, without activation of any of the obstacle detection units, or until the robotic device 40 has turned through a predetermined number of degrees, since initiation of the Edge behavioral mode. The Edge behavioral mode allows the robotic device 40 to move through the smallest possible openings to escape from confined areas.

In the Wheel Drop behavioral mode, the microprocessor reverses the direction of the main wheel drive assemblies momentarily, then stops them. If the activated wheel drop sensor deactivates within a predetermined time, the microprocessor then reimplements the behavioral mode that was being executed prior to the activation of the wheel drop sensor.

In response to certain events, e.g., activation of a wheel drop sensor or a cliff detector, the Slow behavioral mode is implemented to slow down the robotic device 40 for a predetermined distance and then ramp back up to its normal operating speed.

When a safety condition is detected by the sensor subsystem, e.g., a series of task component or wheel stalls that cause the corresponding electric motors to be temporarily cycled off, or a wheel drop sensor or a cliff detection sensor activated for greater that a predetermined period of time, the robotic device 40 is generally cycled to an off state. In addition, an audible alarm may be generated.

The foregoing description of typical behavioral modes for the robotic device 40 are intended to be representative of the types of operating modes that can be implemented by the robotic device 40. One skilled in the art will appreciate that the behavioral modes described above can be implemented in other combinations and other modes can be defined to achieve a desired result in a particular application.

A navigational control system may be used advantageously in combination with the robotic device 40 to enhance the cleaning efficiency thereof, by adding a deterministic component (in the form of a control signal that controls the movement of the robotic device 40) to the motion algorithms, including random motion, autonomously implemented by the robotic device 40. The navigational control system operates under the direction of a navigation control algorithm. The navigation control algorithm includes a definition of a predetermined triggering event.

Broadly described, the navigational control system, under the direction of the navigation control algorithm, monitors the movement activity of the robotic device 40. In one embodiment, the monitored movement activity is defined in terms of the "position history" of the robotic device 40, as described in further detail below. In another embodiment, the monitored movement activity is defined in terms of the "instantaneous position" of the robotic device 40.

The predetermined triggering event is a specific occurrence or condition in the movement activity of the robotic device 40. Upon the realization of the predetermined triggering event, the navigational control system operates to generate and communicate a control signal to the robotic device 40. In response to the control signal, the robotic device 40 operates to implement or execute a conduct prescribed by the control signal, i.e., the prescribed conduct. This prescribed conduct represents a deterministic component of the movement activity of the robotic device 40.

Figure 3:
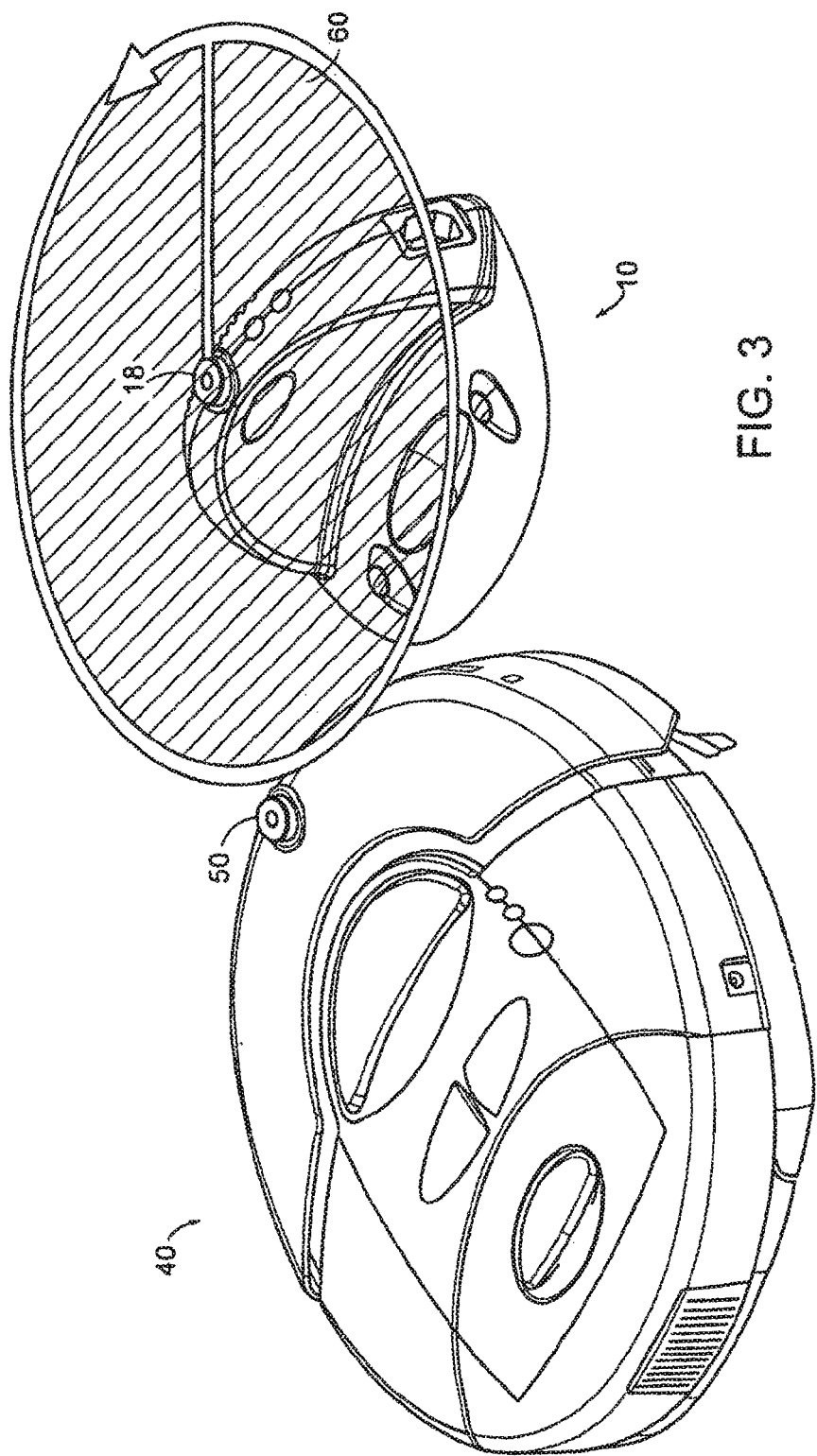
FIG. 3 is a schematic perspective view of a representation of robotic device and base station, depicting an avoidance signal in accordance with one embodiment of the invention transmitted by the base station and detected by the robotic device.

While the robotic device 40 is vacuuming, it will periodically approach the stationary base station 10. Contact with the base station 10 could damage or move the base station into an area that would make docking impossible. Therefore, avoidance functionality is desirable. To avoid inadvertent contact, the base station 10 may generate an avoidance signal 60, as depicted in FIG. 3. The avoidance signal 60 is shown being transmitted from the emitter 18 on the top of the backstop 14. The radial range of the avoidance signal 60 from the base station 10 may vary, depending on predefined factory settings, user settings, or other considerations. At a minimum, the avoidance signal 60 need only project a distance sufficient to protect the base station 10 from unintentional contact with the robot 40. The avoidance signal 60 range can extend from beyond the periphery of the base station 10, to up to and beyond several feet from the base station 10, depending on the application.

Here, the avoidance signal 60 is depicted as an omni-directional (i.e., single plane) infrared beam, although other signals are contemplated, such as a plurality of single stationary beams or signals. If stationary beams are used, however, a sufficient number could provide adequate coverage around the base station 10 to increase the chances of the robotic device 40 encountering them. When the detector 50 of the robotic device 40 receives the avoidance signal 60 from the emitter 18, the robotic device 40 can alter its course, as required, to avoid the base station 10. Alternatively, if the robotic device 40 is actively or passively seeking the base station 10 (for recharging or other docking purposes), it can alter its course toward the base station 10, such as by circling the base station 10, in such a way to increase the chances of encountering the homing signals described with respect to FIGS. 4A-4B below.

In certain embodiments, a collimated IR emitter is used, such as Waitrony p/n IE-320H. Because of potential interference from sunlight and other IR sources, most IR devices, such as remote controls, personal digital assistants and other IR communication devices, emit signals that may be modulated. Herein, the emitters 18, 20 modulate the beams at 38 kHz. In an embodiment of the present invention, additional modulation of the beams at a frequency, for example 500 Hz, different from the frequency of common IR bit streams, prevents interference with other IR equipment. Generally, the avoidance signal 60 is coded, as are the homing signals 62, 64. The bit encoding method as well as binary codes are selected such that the robot 40 can detect the presence of each signal, even if the robot 40 receives multiple codes simultaneously.

Whenever a measurable level of IR radiation from the avoidance signal 60 strikes the detector 50, the robot's IR avoidance behavior is triggered. In one embodiment, this behavior causes the robot 40 to spin in place to the left until the IR signal falls below detectable levels. The robot 40 then resumes its previous motion. Spinning left is desired in certain systems because, by convention, the robot may attempt to keep all objects to its right during following operations. The robot's avoidance behavior is consistent with its other behaviors if it spins left on detecting the avoidance signal 60. In one embodiment, the detector 50 acts as a gradient detector. When the robot 40 encounters a region of higher IR intensity, the robot 40 spins in place. Because the detector 50 is mounted at the front of the robot 40 and because the robot 40 does not move backward, the detector 50 always "sees" the increasing IR intensity before other parts of the robot 40. Thus, spinning in place causes the detector 50 to move to a region of decreased intensity. When the robot 40 next moves forward, it necessarily moves to a region of decreased IR intensity—away from the avoidance signal 60.

In other embodiments, the base station 10 includes multiple coded emitters at different power levels or emitters that vary their power level using a system of time multiplexing. These create concentric coded signal rings which enable the robot 40 to navigate towards the base station 10 from far away in the room. Thus, the robot 40 would be aware of the presence of the base station 10 at all times, facilitating locating the base station 10, docking, determining how much of the room has been cleaned, etc. Alternatively, the robot 40 uses its motion through the IR field to measure a gradient of IR energy. When the sign of the gradient is negative (i.e., the detected energy is decreasing with motion), the robot 40 goes straight (away from the IR source). When the sign of the gradient is positive (energy increasing), the robot 40 turns. The net effect is to implement a "gradient descent algorithm," with the robot 40 escaping from the source of the avoidance signal 60. This gradient method may also be used to seek the source of emitted signals. The concentric rings at varying power levels facilitate this possibility-even without a means for determination of the raw signal strength.

Figure 6A:
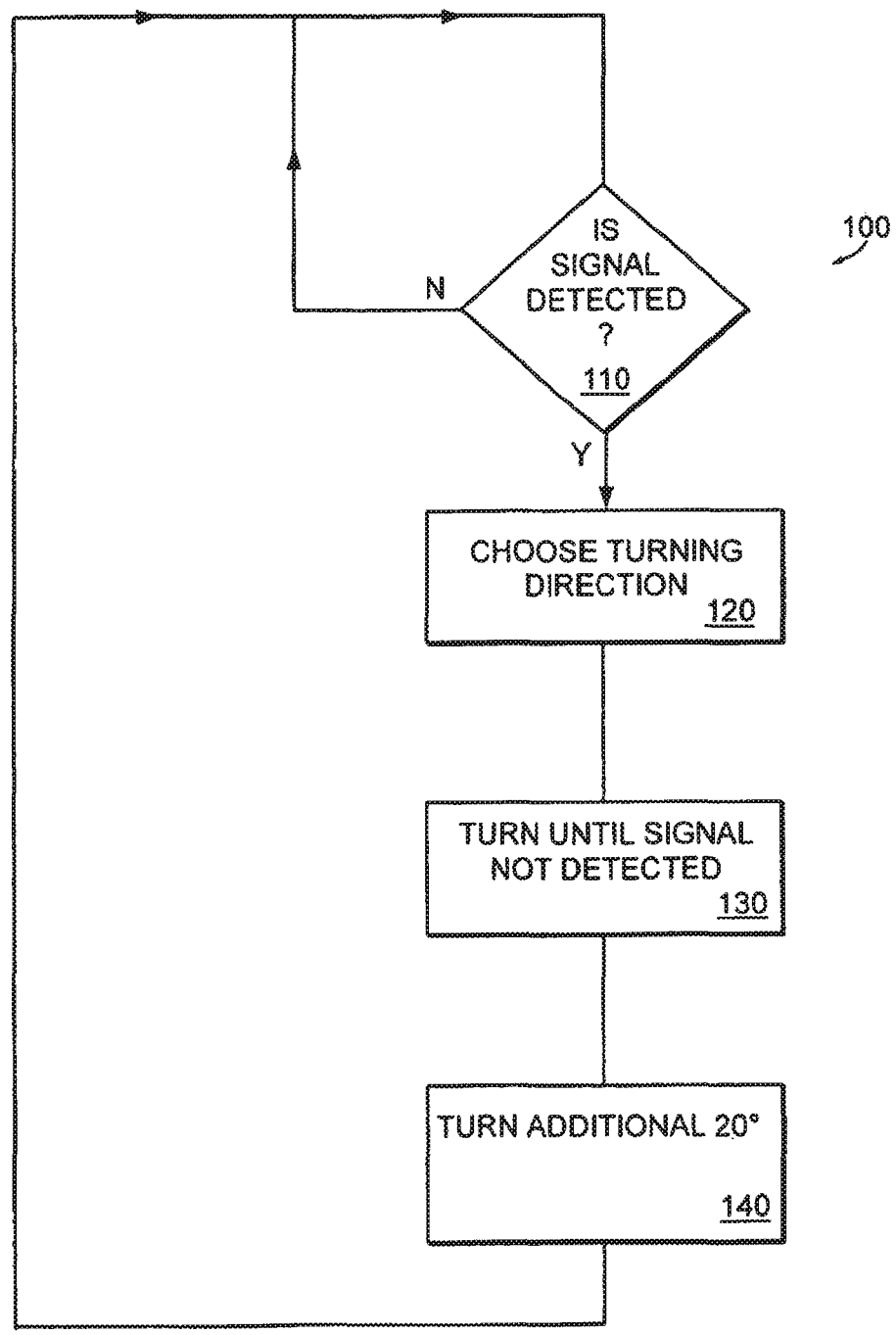
FIGS. 6A-6B are flow charts of avoidance algorithms in accordance with one embodiment of the invention.

A flowchart of one embodiment of the control logic of the avoidance behavior 100 is shown in FIG. 6A. The robot 40 determines whether the signal 110 detected by the detector 50 is an avoidance signal 60. If an avoidance signal 60 is detected, the robot 40 chooses a turning direction 120. The robot 40 then begins to turn in the chosen direction until the avoidance signal 60 is no longer detected 130. Once the avoidance signal 60 is no longer detected, the robot 40 continues turning for an additional amount 140, such as 20°, or the robot may turn randomly between 0 and 135°.

Figure 6B:
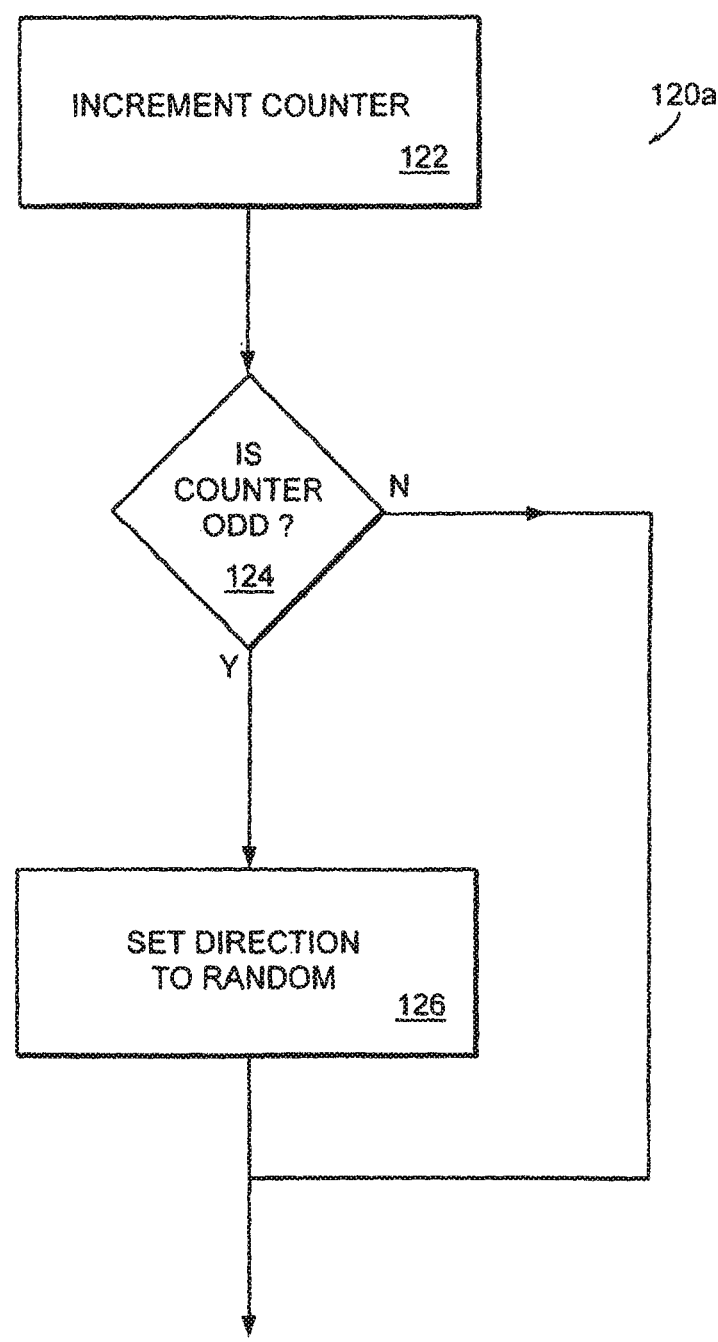

While in flowchart step 120, the direction selection algorithm 120a, illustrated in the flowchart shown in FIG. 6B, is used. The robot's control logic keeps track of the robot's discrete interactions with the beam. The robot 40 first increments a counter by one 122. On odd numbered interactions, the robot 40 chooses a new turning direction randomly 124, 126; on even numbered interactions, the robot 40 again uses its most recent turning direction. In the alternative, the robot 40 may choose which direction to turn at random. It will continue to turn in that direction until it has moved a sufficient distance.

In other embodiments, the robot 40 can always turn in a single direction or choose a direction randomly. When the robot 40 always turns in one direction, it may get stuck in a loop by turning away from the beam, bumping into another obstacle in a room, turning back toward the beam, seeing the beam again, turning away, bumping again, ad infinitum. Moreover, when the robot 40 only turns in a single direction, it consequently may fail to vacuum certain areas of the floor. Thus, where the robot's task is to complete work evenly throughout a room, a single turning direction may not be optimal. If the direction is chosen purely randomly, the robot 40 may turn back and forth often, as it encounters the beam.

Again referring to FIG. 6A, in the embodiment of step 140, the robot 40 turns an additional 20° from the point at which the avoidance signal 60 is lost. The arc of the turn can be varied for the particular robot 40 and application. The additional turn helps to prevent the robot 40 from re-encountering the avoidance signal 60 immediately after first encountering it. For various applications, the amount of additional movement (linear or turning) can be a predetermined distance, angle or time, or in the alternative may include a random component. In still other embodiments, the robot's avoidance behavior may include reversing the robot's direction until the avoidance signal 60 is no longer detected, or as described above, the robot may turn randomly between 0° and 135° after losing the avoidance signal 60.

Figure 4B:
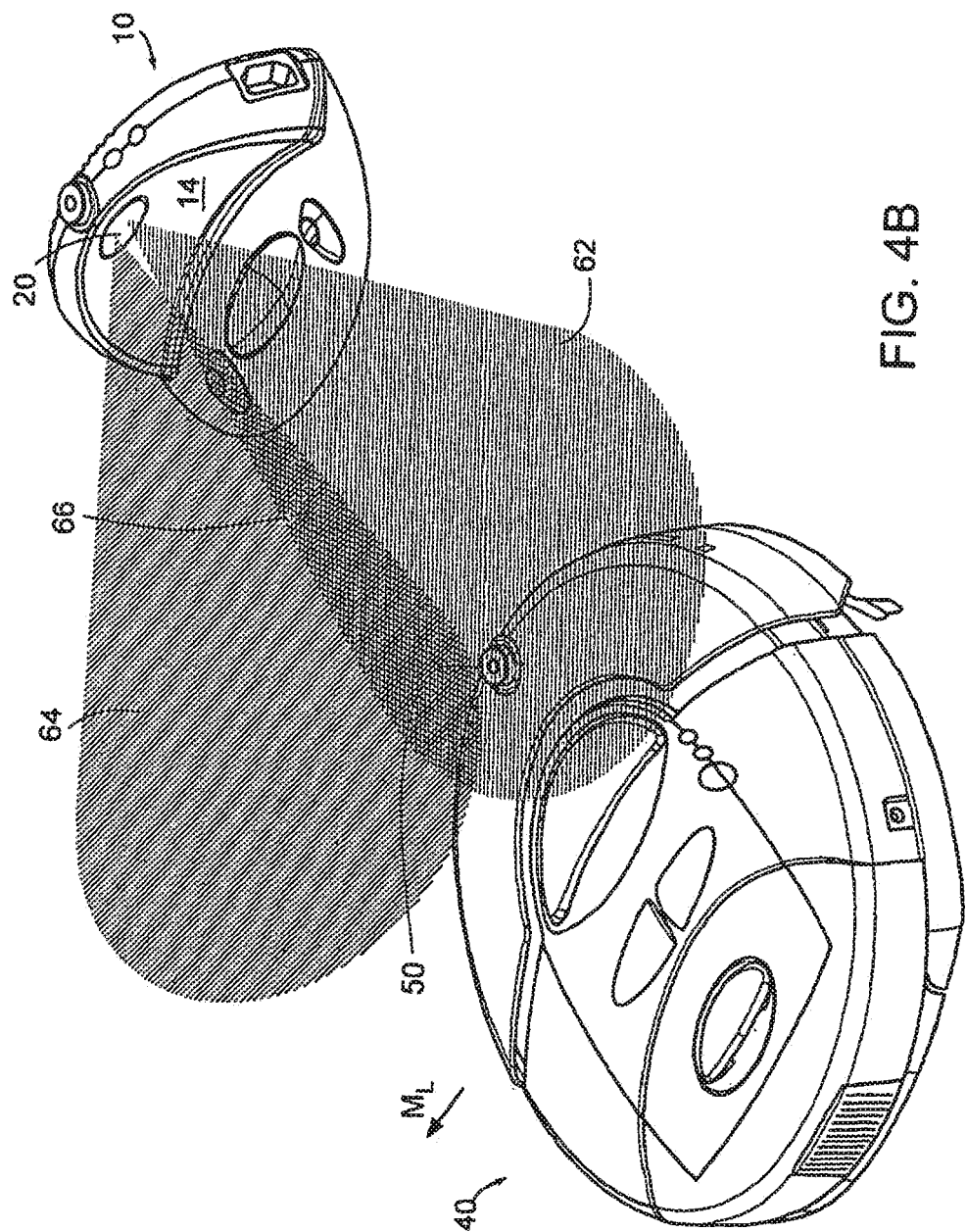
Figure 4C:
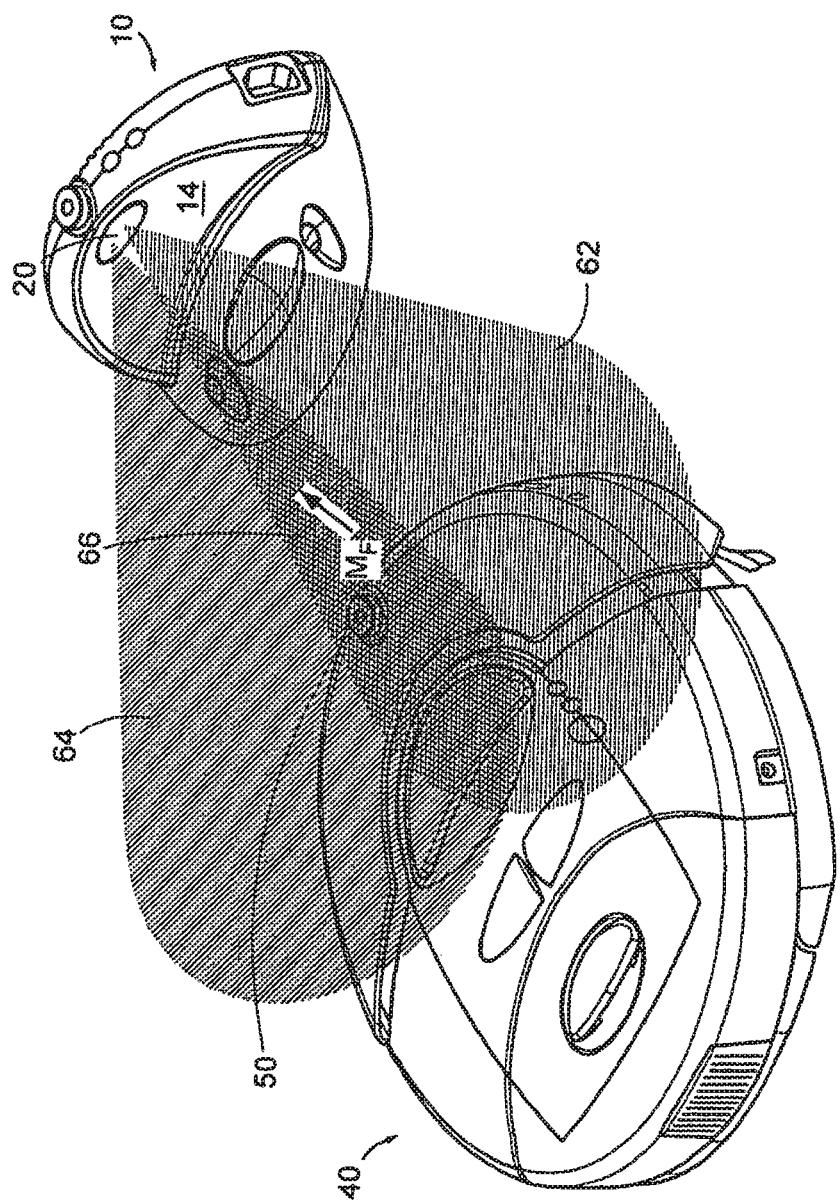

FIGS. 4A-4C depict the robotic device 40 in various stages of seeking the base station 10 by using the homing signals 62, 64. The robotic device 40 may seek the base station 10 when it detects the need to recharge its battery, or when it has completed vacuuming the room. As described above, once the robotic device 40 detects the presence of the avoidance signal 60 (and therefore the base station 10), it can move as required to detect the homing signals 62, 64. As with the avoidance signal 60 above, the projected range and orientation of the homing signals 62, 64 may be varied, as desired. It should be noted however, that longer signals can increase the chance of the robot 40 finding the base station 10 efficiently. Longer signals can also be useful if the robotic device 40 is deployed in a particularly large room, where locating the base station 10 randomly could be inordinately time consuming. Homing signal 62, 64 ranges that extend from approximately six inches beyond the front of the base plate 12, to up to and beyond several feet beyond the base plate 12 are contemplated, depending on application. Naturally, the angular width of the homing signals 62, 64 may vary depending on application, but angular widths in the range of 5° to up to and beyond 60° are contemplated. A gradient behavior as described above can also be used to aid the robot in seeking out the base station.

In addition to operating as navigational beacons, homing signals 62, 64 (and even the avoidance signal 60) may also be used to transmit information, including programming data, fail safe and diagnostic information, docking control data and information, maintenance and control sequences, etc. In such an embodiment, the signals can provide the control information, dictating the robot's reactions, as opposed to the robot 40 taking certain actions upon contacting certain signals from the base station 10. In that case, the robot 40 functions as more of a slave to the base station 10, operating as directed by the signals sent.

The robot 40 performs its docking with the base station 10 accurately and repeatably, without the need for gross mechanical guidance features. The two homing signals 62, 64 are distinguishable by the robotic device, for example as a red signal 62 and a green signal 64. IR beams are generally used to produce the signals and, as such, are not visible. The color distinction is given for illustrative purposes only, and any "color" (i.e., signal bit pattern) may be used, provided the robotic device 40 recognizes which signal to orient a particular side. Alternatively, the signals 62, 64 may be distinguished by using different wavelengths or by using different carrier frequencies (e.g., 380 kHz versus 38 kHz, etc.).

Thus, when the robotic device 40 wants or needs to dock, if the detector 50 receives the red signal 62 transmitting from the base station 10, it moves to keep the red signal 62 on the robot's right side; if it detects the green signal 64 transmitting from the base station 10, it moves to keep the green signal 64 on the robot's left side. Where the two signals overlap (the "yellow" zone 66), the robot 40 knows that the base station 10 is nearby and may then dock. Such a system may be optimized to make the yellow zone 66 as thin as practicably possible, to ensure proper orientation and approach of the robot 40 and successful docking. Alternatively, the red signal 62 and green signal 64 may be replaced by a single signal, which the robot 40 would follow until docked.

FIGS. 4A-4C depict, at various stages, a docking procedure utilizing two signals. In FIG. 4A, the detector 50 is in the green or left signal 64 field, and thus the robotic device 40 will move towards the right, in direction $M_R$ in an effort to keep that green signal 64 to the left of the robot 40 (in actuality, the robot 40 moves to keep the green signal 64 to the left of the detector 50). Similarly, in FIG. 4B, the detector 50 is in the red or right signal 62 field, and thus the robotic device 40 will move towards the left, in direction $M_L$ in an effort to keep that red signal 64 to the right of the detector 50. Last, in FIG. 4C, the detector 50 has encountered yellow zone 66. At this point, the robotic device 40 will move in direction $M_F$ directly towards the base station 10. While approaching the base station 10, the robotic device 40 may slow its speed of approach and/or discontinue vacuuming or perform other functions to ensure trouble-free docking. These operations may occur when the robot 40 detects the avoidance signal 60, thus recognizing that it is close to the base station 10, or at some other predetermined time, e.g., upon a change in the signal from the emitters 62, 64.

Figure 5:
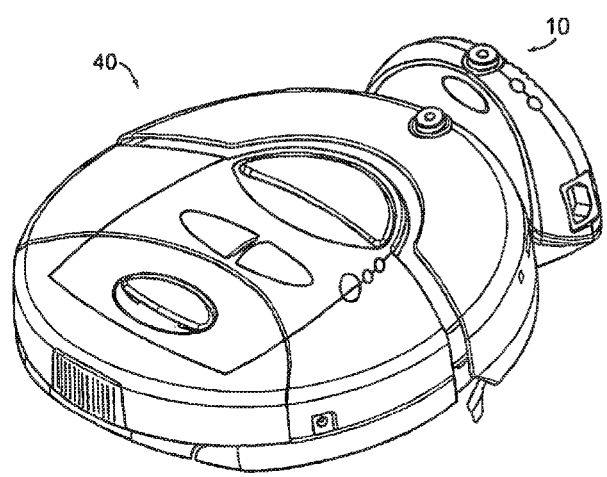
FIG. 5 is a schematic perspective view of the robotic device and the base station in a docking or mating position.

Various methods are contemplated for ensuring that the robot 40 correctly docks with base station 10. For example, the robot 40 can continue to move toward the base station 10 (within the yellow zone 66) until the bumper 48 is depressed, signaling the robot 40 that it has contacted the base station 10. Another embodiment overlaps the homing signals 62, 64 such that the yellow zone 66 terminates at a point calibrated such that the robot 40 will contact the charging contacts 16 upon reaching the termination point. Other embodiments simply stop the robot 40 when its electrical contacts touch the electrical contacts 16 on the base station 10. This would guarantee that the robot 40 is moving over the contacts 16, providing a wiping action that cleans the contacts 16 and improves the electrical integrity of the connection. This also enables the base station 10 to be lighter, since it does not have to resist the force necessary to depress the robot's bumper 48. FIG. 5 shows the robotic device 40 completely docked with the base station 10. Naturally, this procedure may also utilize detector 52 or a combination of both detectors.

While this embodiment of the invention describes use of IR signals for both avoidance and homing, the system and method of the present invention can use other signals to accomplish the goals. Other types of waves may have drawbacks, however. For example, radio waves are more difficult and expensive to make directional, and visible light suffers from interference from many sources and may be distracting to users. Sound waves could also be used, but it is similarly difficult to make sound purely directional and such waves tend to scatter and reflect more.

Figure 7:
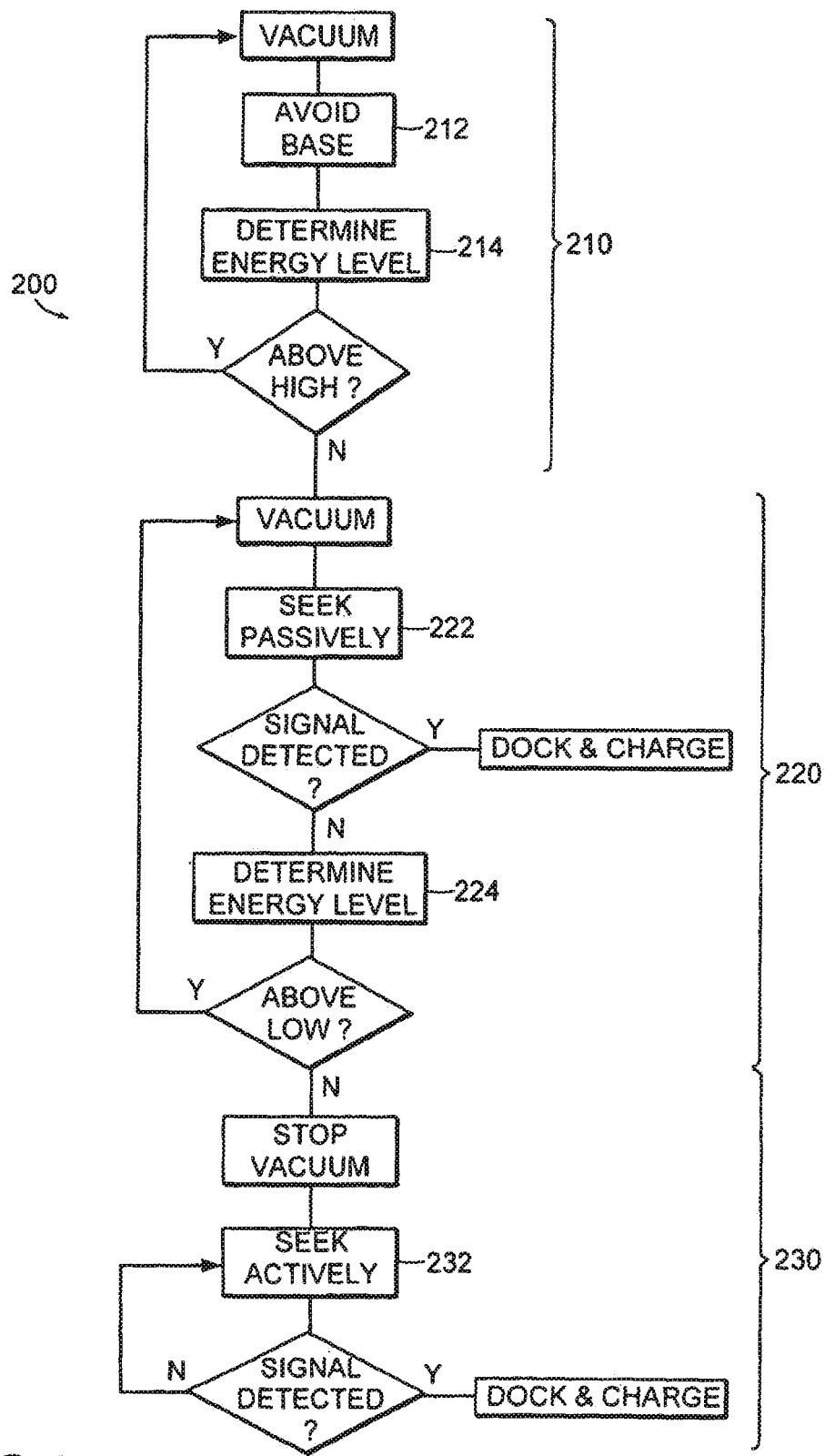
FIG. 7 is a flow chart of an energy management algorithm in accordance with one embodiment of the invention.

FIG. 7 depicts a schematic diagram which shows the control sequence 200 of the robotic device 40 during vacuuming. Generally, the control sequence 200 includes three subsequences based on the measured energy level of the robotic device 40. Those are referenced generally as a high energy level 210, a medium energy level 220, and a low energy level 230. In the high energy level subsequence 210, the robotic device 40 performs its predetermined task, in this case, vacuuming (utilizing various behavioral modes as described above), while avoiding the base station 212. When avoiding the base station 212, the robotic device 40 performs its avoidance behavior and continues to operate normally. This process continues while the robotic device 40 continually monitors its energy level 214. Various methods are available to monitor the energy level 214 of the power source, such as coulometry (i.e., the measuring of current constantly entering and leaving the power source), or simply measuring voltage remaining in the power source. Other embodiments of the robotic device 40 may simply employ a timer and a look-up table stored in memory to determine how long the robotic device 40 can operate before it enters a different energy level subsequence. Still other embodiments may simply operate the robot 40 for a predetermined time period before recharging, without determining which energy level subsequence it is operating in. If the robot 40 operates on a liquid or gaseous fuel, this level may also be measured with devices currently known in the art.

Once the energy remaining drops below a predetermined high level, the robot 40 enters its medium energy level sequence 220. The robot 40 continues to vacuum and monitor its energy level 224, employing methods indicated in step 214 above. In the medium energy level 220, however, the robot 40 "passively seeks" 222 the base station 10. While passively seeking 222 the base station 10, the robot 40 does not alter its travel characteristics; rather, it continues about its normal behavioral mode until it fortuitously detects the avoidance signal 60 or a homing signal 62, 64, each of which may be followed until the robot 40 ultimately docks with the base station 10. In other words, if the robot detects the avoidance signal 60 while passively seeking 222, rather than avoiding the base station 10 as it normally would, it alters its travel characteristics until it detects the homing signals 62 or 64, thus allowing it to dock.

Alternatively, the robot 40 continues operating in this medium energy level subsequence 220 until it registers an energy level 224 below a predetermined low level. At this point, the robot 40 enters the low level subsequence 230, characterized by a change in operation and travel characteristics. To conserve energy, the robot 40 may discontinue powering all incidental systems, and operations, such as vacuuming, allowing it to conserve as much energy as possible for "actively searching" 232 for the base station 10. While actively searching 232, the robot 40 may alter its travel characteristics to increase its chances of finding the base station 10. It may discontinue behavioral modes such as those employing a spiral movement, which do not necessarily create a higher chance of locating the base station, in favor of more deliberate modes, such as wall-following. This deliberate seeking will continue until the robot 40 detects the presence of the base station 10, either by detecting the avoidance signal 60 or the homing signals 62, 64. Clearly, additional subsequences may be incorporated which sound alarms when the power remaining reaches a critical level, or which reconstruct the route the robot 40 has taken since last contacting the base station 10 to aid in relocating the station 10.

The robot 40 may also dock because it has determined that it has completed its assigned task (e.g., vacuuming a room). The robot 40 may make this determination based on a variety of factors, including considerations regarding room size, total run time, total distance traveled, dirt sensing, etc. Alternatively, the robot may employ room-mapping programs, using the base station 10 and/or walls and large objects as points of reference. Upon determining that it has completed its task, the robot 40 will alter its travel characteristics in order to find the base station 10 quickly.

Once the robot 40 contacts the base station 10, it can recharge itself autonomously. Circuitry within the base station 10 detects the presence of the robot 40 and then switches on the charging voltage to its contacts 16. The robot 40 then detects the presence of the charging voltage and then switches on its internal transistor power switch to allow current flow into the battery. In one embodiment, the base station 10 contains a constant-current type switching charger. Maximum current is limited to approximately 1.25 amps even under a short circuit condition. Maximum unloaded terminal voltage is limited to approximately 22 Vdc. This constant-current charging circuit is used to charge the battery in the robot 40 via the electrical connections provided by the contacts 16 on the base station 10 and those on the undercarriage 54 of the robot 40. One embodiment of this charging sequence is detailed below.

Generally, while the robot 40 is away from the base station 10, the charging contacts 16 will present five volts, limited to 1 mA maximum short circuit current flow. This low voltage/low current "sense" condition limits the amount of available energy at the contacts 16, thus rendering them safe in the event they are contacted by humans, animals, and electrically conductive objects. The contacts on the undercarriage 54 of the robot 40, when contacting the contacts 16 on the base station 10, present a precise resistive load that, along with a resistor in the base station 10, creates a high impedance voltage divider. A microprocessor that constantly monitors the voltage across the contacts 16 recognizes this lower voltage. This voltage divider creates a specific voltage, plus or minus a known tolerance. When the microprocessor determines that the voltage has fallen into the specific range, it detects that the robot 40 is present. The microprocessor then turns on a transistor switch that delivers a higher voltage/current charge (capable of charging the robot's internal battery) to the charging contacts 16. Alternatively, the robot 40 and/or base station 10 can verify the integrity of the charging circuit by sending signals through the IR beams, thereby confirming that the robot 40 has, in fact, docked.

Figure 8:
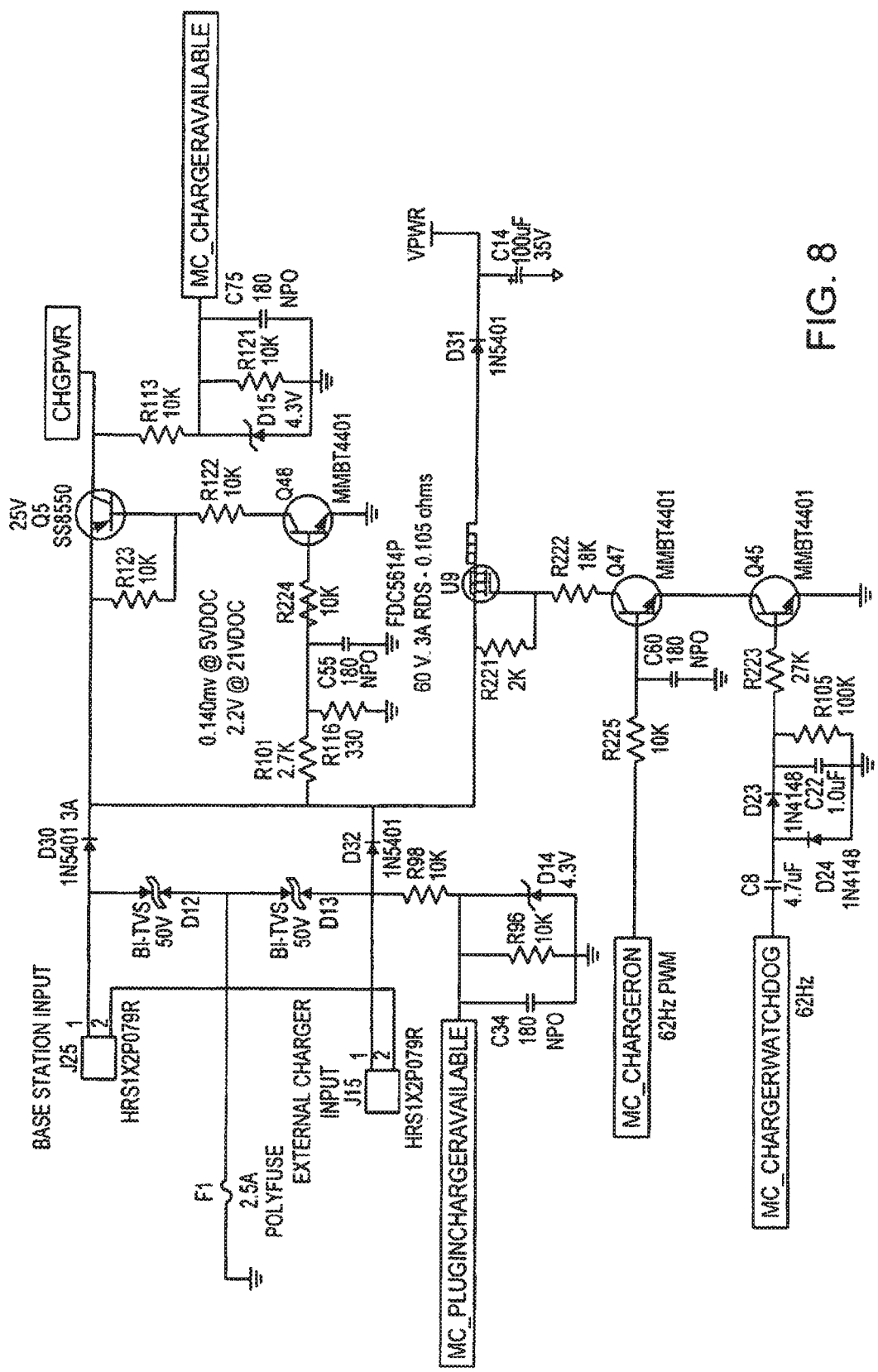
FIG. 8 depicts an embodiment of the charger circuitry schematic in accordance with one embodiment of the invention.

FIG. 8 depicts an embodiment of the charger circuitry schematic. With five volts being presented by the base station, it is the job of resistor dividers R101 and R116 to hold Q48 and Q5 off when J25 is in contact with the initial low voltage state. This divider also provides the known impedance of R101 plus R116 in parallel with R224 plus the base-emitter diode drop of Q48. This Thevenin impedance is in series with a resistor in the docking station thus forming a voltage divider. A window comparator circuit within the docking station looks for a specific voltage created by the divider. Once the base station has determined this impedance is likely the robot (not some other conductive body), it then delivers the full 22 volt capable, 1.25 Amp charging voltage to the robot.

At the onset of this higher voltage, the divider of R101 and R224 are such that the requirements are met to turn on Q48 and Q5 respectively. It is this combination of transistors that then allows current to flow to the on-board robot electronics only, allowing the robot's processor to become active if in fact it was inoperative due to a depleted battery.

Once operative, the robot's processor is then able to detect the presence of the base station voltage via R113 and D15 and if driving, turn off its drive motors. Once stable on the charging contacts, it becomes the job of the robot processor to measure the internal robot battery and decide when and what type of charging control cycle is needed when allowing current to flow into the battery. For example, if the battery is at 12 volts, then it is acceptable to turn on Q45 and Q47 via processor control, in order to allow current to flow through FET U9 to the battery on a continuous basis.

If, however, the battery voltage is deemed less than 5 volts, it generally would not be desirable to allow the full current to flow to the battery on a continuous basis. The reason this condition is of concern lies in the fact that the power source within the DOC is a constant current charger, which will adjust its output voltage to be slightly higher than the battery voltage in order to flow 1.25 A into the battery. In some cases, this might be millivolts higher than the battery voltage itself and in the case of the battery at low voltage, for example, 3 volts, would cause the output voltage to drop below the necessary 5 volt level needed to operate the on board base station and robot electronics suite.

In this case, the robot processor then delivers a pulse width modulation to the charger control line pertaining to Q47, such that the energy storage capacitors in both the robot and base station maintain enough charge to keep their respective electronics working properly throughout the charge pulse. The energy storage capacitors are then replenished during the off time of the pulse width modulation charging cycle, ready to then sustain the next charge pulse. This scenario continues until the battery has been charged to the point where a continuous charge is no longer able to bring the supply voltage down to a critical level and the charge control can become a static level.

Since this pulse width modulation process in this embodiment relies on software control, health monitoring of the processor, both within the base station and robot, are important. The requirement then set fourth for charging is for a charger "watchdog" be incorporated via Q45 such that a static high or low state on this signal line will disable current flow into the battery. It is a requirement of the robot processor to continuously pulse this control line in order for any current to flow, therefore eliminating most cases of processor latch up due to electrostatic discharge or other battery related events from mistreating the charging profile. Naturally, other control and related fail safe schemes could be utilized.

The described charging sequence provides particular safety features, even though the charging contacts 16 are exposed and energized. Because a specific resistance is required to create a specific voltage drop across the contacts 16 when the 5-volt sense voltage is present (i.e., when the robot 40 is not docked) there is no danger of electric shock due to accidental contact because the low sense current is harmless. Also, the base station 10 will never switch to the higher voltage/current level, because the sense current has not entered the predetermined range. When the base station 10 does determine that the robot 40 is present, it delivers the charging voltage/current. This charging current is limited to approximately 22 volts/1.25 amps maximum. Even if inadvertent contact occurred during delivery of the charging current—which is unlikely, since the robot chassis 44 effectively blocks the contacts 16—the voltage delivered would not present a serious shock hazard, as it is relatively low.

Another level of safety is afforded by the base station 10 checking for the robot 40 at regular intervals, from as little as once per minute to as much as 10 times per second or more. Thus, in the event that the robot 40 is dislodged from the base station 10 (either by an animal or human), the charging current could be shut down immediately. This same condition applies if the contacts 16 are short circuited with the robot 40 docked (either intentionally or accidentally, for example, if the robot 40 drags debris onto the charging contacts 16).

An additional safety feature of this charging sequence prevents overheating of contacts 16 due to intentional shorting or oxidation. A thermal circuit breaker or similar device can be employed to perform this task, as well as a microprocessor equipped with a temperature measuring subroutine. The circuit breaker, however, provides the advantage of controlling contact temperature in the event of a microprocessor or software failure. Additionally, the base station 10 circuitry can also incorporate a timer to reset the temperature measuring subroutine or circuit breaker in the event of system failure. These safety controls may be incorporated into the "watchdog" described above.

While docked with the base station 10, the robot 40 can also perform other maintenance or diagnostic checks. In certain embodiments, the robot 40 can completely recharge its power source or only partially charge it, based on various factors. For example, if the robot 40 determines, through the use of route-tracking subroutines, that only a small portion of the room still requires vacuuming, it may take only a minimal charge before returning to complete cleaning of the room. If, however, the robot 40 requires a full charge before returning to clean the room, that option is also available. If the robot 40 has completed its vacuuming of the room prior to docking, it may dock, fully recharge, and stand by to await a signal (either internal or external) to begin its next cleaning cycle. While in this stand-by mode, the robot 40 may continue to measure its energy levels and may begin charging sequences upon reaching an energy level below a predetermined amount. Alternatively, the robot 40 may maintain a constant or near-constant trickle charge to keep its energy levels at or near peak. Other behaviors while in the docking position such as diagnostic functions, internal mechanism cleaning, communication with a network, or data manipulation functions may also be performed.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. An autonomous cleaning robot comprising:
    a housing;
    a motive system to propel the housing across a ground surface;
    an energy storage unit supported by the housing and configured to be charged while the robot is positioned at a base charging station;
    a plurality of detectors mounted on the housing, the plurality of detectors comprising a first detector positioned on a front portion of the housing and a second detector positioned on the housing below the first detector, the first detector being an omnidirectional detector mounted at a highest point of the robot; and
    a navigational control system to autonomously control the motive system to
        direct the robot about a room to clean the room,
        direct the robot to seek the base charging station upon detecting a need to recharge the energy storage unit, and
        direct the robot to approach the base charging station to dock the robot based on a first signal emitted by a first emitter of the base charging station and received by the first detector, and based on a second signal emitted by a second emitter of the base charging station and received by the second detector.

2. The robot of claim 1, further comprising a vacuum system operable
    in a first energy level mode while the robot is directed about the room to clean the room, and
    in a second energy level mode while the robot is directed to seek the base charging station.

3. The robot of claim 2, wherein the vacuum system is operable in the first energy level mode for a predetermined time period before being operated in the second energy level mode.

4. The robot of claim 2, further comprising an energy level monitor to detect a low energy level, wherein the vacuum system is configured to adjust operation of the vacuum system from the first energy level mode to the second energy level mode in response to detecting the low energy level.

5. The robot of claim 1, wherein the second detector is positioned on a side of the robot.

6. The robot of claim 1, wherein the navigational control system is configured to direct the robot to seek the base charging station based on the first signal received by the first detector.

7. The robot of claim 1, wherein the navigational control system is configured to direct the robot to seek the base charging station by executing a following behavior in which the robot moves along an obstacle to seek the base charging station.

8. The robot of claim 1, wherein the navigational control system is configured to direct the robot to approach the base charging station by reorienting the robot relative to the base charging station based on the second signal.

9. The robot of claim 8, wherein the navigational control system is configured to direct the robot to approach the base charging station by reorienting the robot relative to the base charging station based on the second signal and based on a third signal emitted by a third emitter of the base charging station.

10. The robot of claim 1, wherein the robot is configured to receive programming information from the base charging station.

11. The robot of claim 1, wherein:
    the second signal is one of a plurality of second signals emitted by the base charging station, and
    the navigational control system is configured to control the motive system to direct the robot to approach the base charging station further based on the plurality of second signals emitted by the base charging station and received by the second detector.

12. A system comprising:
    a base charging station comprising
        a backstop, and
        emitters comprising an upper emitter positioned on the backstop and a plurality of lower emitters positioned on the backstop below the upper emitter; and
    an autonomous cleaning robot comprising a navigational control system to direct the robot to approach the base charging station to recharge an energy storage unit of the robot based on a first signal emitted by the upper emitter and received by the robot and based on a plurality of second signals emitted by the plurality of lower emitters and received by the robot.

13. The system of claim 12, wherein the base charging station is configured to transmit programming information to the autonomous cleaning robot.

14. The system of claim 12, wherein the base charging station is configured to transmit and receive data between the base charging station and the autonomous cleaning robot.

15. The system of claim 12, wherein the robot comprises a first detector to receive the first signal from the base charging station, and a second detector positioned below the first detector to receive the plurality of second signals transmitted from the base charging station.

16. The system of claim 12, wherein the upper emitter is an omnidirectional emitter mounted on a topmost portion of the base charging station.

17. A method of docking an autonomous cleaning robot, the method comprising:
    seeking a base charging station;

detecting, using a first detector mounted at a highest point of the robot, a first signal emitted by the base charging station, the first signal indicative of a presence of the base charging station, the first detector being omnidirectional; and in response to detecting the first signal, approaching the base charging station to dock the robot at the base charging station while detecting, using a second detector positioned below the first detector, a second signal emitted by the base charging station.

18. The method of claim 17, wherein seeking the base charging station comprises seeking the base charging station while a vacuum operation is in a reduced energy level mode.

19. The method of claim 17, wherein:

the second signal is one of a plurality of second signals emitted by the base charging station, and approaching the base charging station comprises approaching the base charging station while detecting, using the second detector, the plurality of second signals emitted by the base charging station.

20. The method of claim 19, wherein approaching the base charging station comprises approaching the base charging station while reorienting the robot relative to the base charging station based on an overlap of the plurality of second signals.

* * * * *